US008311051B2

(12) United States Patent
Balazich et al.

(10) Patent No.: US 8,311,051 B2
(45) Date of Patent: Nov. 13, 2012

(54) USE OF HARDWARE TO MANAGE DEPENDENCIES BETWEEN GROUPS OF NETWORK DATA PACKETS

(75) Inventors: Douglas G. Balazich, Poughkeepsie, NY (US); Carl A. Bender, Highland, NY (US); Douglas J. Joseph, Danbury, CT (US); Peter K Szwed, Ithaca, NY (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 12/727,526

(22) Filed: Mar. 19, 2010

(65) Prior Publication Data

US 2010/0179989 A1    Jul. 15, 2010

Related U.S. Application Data

(63) Continuation of application No. 12/142,128, filed on Jun. 19, 2008, now Pat. No. 7,724,757, which is a continuation of application No. 10/685,252, filed on Oct. 14, 2003, now Pat. No. 7,408,945.

(51) Int. Cl.
*H04L 12/28* (2006.01)

(52) U.S. Cl. ........................................ 370/412; 370/429
(58) Field of Classification Search .................. 370/412, 370/429; 711/118
See application file for complete search history.

(56) References Cited

U.S. PATENT DOCUMENTS

| | | | |
|---|---|---|---|
| 5,325,493 A | 6/1994 | Herrell et al. | |
| 5,467,346 A | 11/1995 | Ito et al. | |
| 6,147,996 A | 11/2000 | Laor et al. | |
| 6,246,684 B1 | 6/2001 | Chapman et al. | |
| 6,253,247 B1 | 6/2001 | Bhaskar et al. | |
| 6,351,454 B1 | 2/2002 | Crocker et al. | |
| 6,510,474 B1 | 1/2003 | Stracovsky et al. | |
| 6,587,894 B1 | 7/2003 | Stracovsky et al. | |
| 2003/0058878 A1 | 3/2003 | Minnick et al. | |
| 2003/0233503 A1* | 12/2003 | Yang et al. | ..................... 710/100 |

OTHER PUBLICATIONS

"MPI Programming Guide" Version 3, Release 2, IBM Publication SA22-7422-01, Dec. 2001.
"Parallel System Support Programs for AIX—Administration Guide," IBM Publication No. SA22-7348-05, May 2003.
"Parallel System Support Programs for AIX—Command and Technical Reference," vol. 2—SA22-7351-05, May 2003.
MPI Standard; http://www-unix.mcs.anl.gov/mpi/index.html, 1997.
Office Action for U.S. Appl. No. 10/685,252 dated Jan. 25, 2008.

\* cited by examiner

*Primary Examiner* — Jung Park
(74) *Attorney, Agent, or Firm* — Steven Chiu, Esq.; Kevin P. Radigan, Esq.; Heslin Rothenberg Farley & Mesiti P.C.

(57) ABSTRACT

A task obtained by a communications processor is decomposed into one or more requests that form a request group. The requests of the request group are sent to main memory and responses to those requests are expected. There may be requests for a plurality of request groups being processed concurrently. However, responses to the request groups are to be returned to the communications processor in the order in which the request groups were sent from the communications processor. To ensure this ordering, dependencies between the request groups are tracked by hardware coupled to the communications processor.

20 Claims, 9 Drawing Sheets

USE OF HARDWARE TO MANAGE DEPENDENCIES BETWEEN GROUPS OF NETWORK DATA PACKETS

CROSS-REFERENCE TO RELATED APPLICATIONS

This application is a continuation of U.S. patent application Ser. No. 12/142,128, filed Jun. 19, 2008, now U.S. Pat. No. 7,724,757, entitled "Use of Hardware to Manage Dependencies Between Groups of Network Data Packets," by Balazich et al., which is a continuation of Ser. No. 10/685,252, filed Oct. 14, 2003, now U.S. Pat. No. 7,408,945, issued Aug. 5, 2008, entitled "Use of Hardware to Manage Dependencies Between Groups of Network Data Packets", by Balazich et al., the entirety of each of which is hereby incorporated herein by reference.

BACKGROUND

This invention relates, in general, to managing requests within a communications environment, and in particular, to tracking dependencies between request groups of the environment.

In various communications environments, the passing of data packets between communications units of an environment is performed using a specialized, dedicated communications processor. Each communications unit of the environment has such a processor, which is used to send or receive data packets over an external connection. In the case of a sending unit, the communications processor gathers the data of a packet from the host system's main memory into a temporary staging buffer. Then, when the gather is complete, the communications processor initiates the sending of the data packet over the external connection. In the case of a receiving system, after a packet has been received over an external connection into a temporary staging buffer, the communications processor scatters the packet data out to the host system's main memory.

To achieve enhanced throughput of the communications environment, the communications processor may be at various stages of processing for multiple data packets at any given time. Thus, it is possible that the data returned to the communications processor from the main memory may be in an order that differs from the order in which the requests for the data were sent to the main memory.

In some systems, however, it is important that the data sent by the communications processor over the external connection correspond to the same order in which the requests were issued by the communications processor to the main memory. Thus, previously, the communications processor had the responsibility of ensuring that the memory responses were placed in proper order and then sent over the external connection in proper order. This required that code be added to the specialized communications processor, which increased the complexity and cost of the communications processor and degraded its performance.

Based on the foregoing, a need still exists for an enhanced capability for managing out-of-order data packets. In particular, a need exists for a capability that enables the grouping of data packet requests into request groups, and the tracking of dependencies between the request groups in order to ensure proper ordering of the data packets.

BRIEF SUMMARY

The shortcomings of the prior art are overcome and additional advantages are provided through the provision of a method of managing request groups of a communications environment. The method includes, for instance, obtaining a plurality of request groups, wherein the obtaining includes grouping, by a communications processor of the communications environment, a plurality of requests for a plurality of tasks into the plurality of request groups; tracking, by hardware of the communications environment, a dependency between at least multiple request groups of the plurality of request groups, the hardware being separate from the communications processor; and sending a response for a request group of the at least multiple request groups to the communications processor of the communications environment in an order indicated by the tracking, wherein the communications processor is alleviated from determining order of responses.

Systems corresponding to the above-summarized method are also described and claimed herein.

Additional features and advantages are realized through the techniques of the present invention. Other embodiments and aspects of the invention are described in detail herein and are considered a part of the claimed invention.

BRIEF DESCRIPTION OF SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, a capability is provided that facilitates the ordering of data packets in a communications environment. This capability includes, for instance, a hardware mechanism that removes the ordering responsibility from the communications processors of the environment. In one example, requests from a communications processor are grouped into request groups and forwarded to main memory. The order in which the request groups are sent out from the communications processor is to be maintained, and thus, there is an order dependency between request groups. For example, if Request Group A is sent prior to Request Group B, then a response for Request Group A is to precede Request Group B, and a response for Request Group B is to succeed Request Group A. The dependencies between request groups are tracked to ensure that the responses for the request groups are provided in the same order as the request groups were sent out from the communications processor.

Figure 1A:
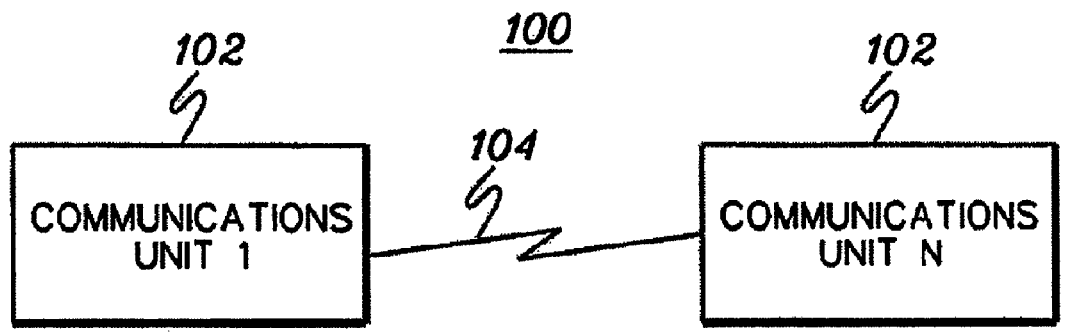
FIG. 1a depicts one embodiment of a communications environment incorporating and using one or more aspects of the present invention.

One embodiment of a communications environment incorporating and using one or more aspects of the present invention is described with reference to FIG. 1a. As shown in FIG. 1a, a communications environment 100 includes a plurality of communications units 102 coupled to one another via a connection 104. Connection 104 may include many types of connections, including, for instance, a wire connection, a token ring or a network connection, to name just a few examples. In one example, the connection used herein employs the Transmission Control Protocol (TCP/IP).

As examples, a communications unit may include an RS/6000 computer system running an AIX operating system, offered by International Business Machines Corporation, Armonk, N.Y.; a server based on the z/Architecture, offered by International Business Machines Corporation; or a UNIX workstation running a UNIX based operating system. The communications units may be homogeneous or heterogeneous to one another and many types of communications units can incorporate and/or use one or more aspects of the present invention. Each communications unit may be a sender and/or a receiver.

In one embodiment, a communications unit employs, for instance, a message passing protocol to facilitate communications. As examples, the message passing protocol includes one or more of a Message Passing Interface (MPI), a Low-Level Application Programming Interface (LAPI), and an Internet Protocol (IP).

An industry-established MPI standard is available at http://www-unix.mcs.anl.gov/mpi/index.html, which is hereby incorporated herein by reference in its entirety. MPI includes a library that is responsible for providing a set of subroutines to be called by applications to cause messages to be sent or received. Features of MPI are described in an IBM Publication SA22-7422-01 entitled, "MPI Programming Guide" Version 3, Release 2, (December 2001), http://publib.boulder.ibm.com/doc_link/en_US/a_doc_lib/sp34/pe/html/am106 mst.html, which is hereby incorporated herein by reference in its entirety.

LAPI is described in articles entitled, "Understanding the LAPI" and "Using the LAPI" available from IBM and at http://www.research.ibm.com/actc/opt_lib/LAPI_under.htm, as well as in "Parallel System Support Programs for AIX—Administration Guide," IBM Publication Number SA22-7348-05, May 2003; and "Parallel System Support Programs for AIX—Command and Technical Reference," Volume 2-SA22-7351-05, May 2003, each of which is hereby incorporated herein by reference in its entirety.

Figure 1B:
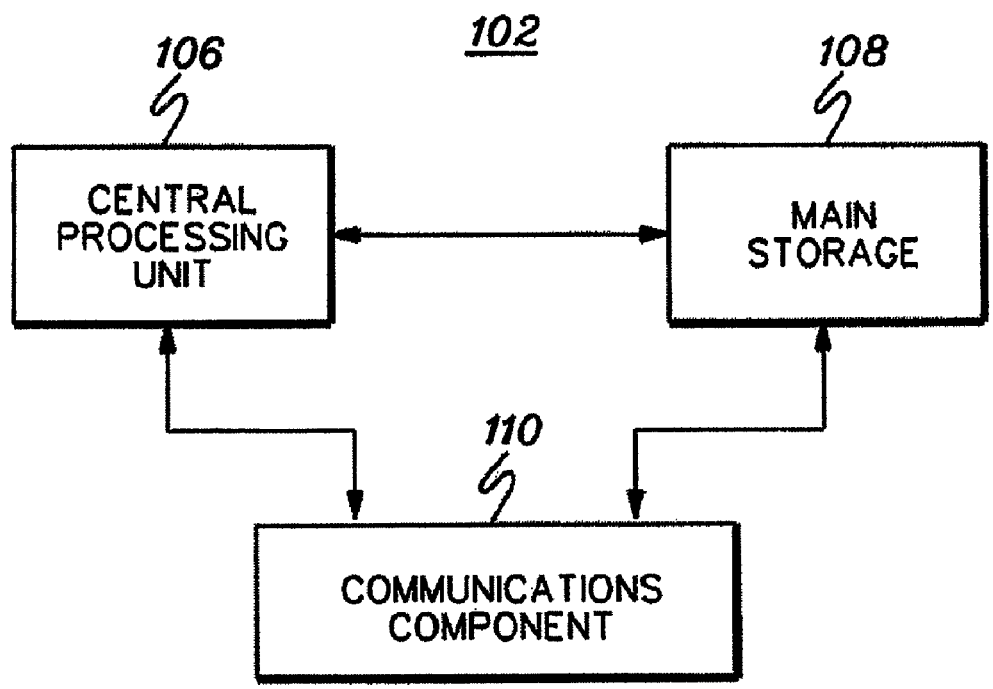
FIG. 1b depicts one embodiment of further details of a communications unit of FIG. 1a, in accordance with an aspect of the present invention.

Further details regarding one example of a communications unit are described with reference to FIG. 1b. Communications unit 102 includes, for instance, a central processing unit 106 coupled to main storage 108 and a communications component 110. The communications component is, for instance, a specialized, dedicated processor used to send or receive packet data over an external connection. Both the sending communications unit and the receiving communications unit include such a communications component. In the case of a sending system, the communications component gathers packet data from the host system's main memory into a temporary staging buffer and then when the gather is complete, it initiates the sending of the packet over the external connection. In the case of a receiving system, after a packet has been received over an external connection into a temporary staging buffer, the communications component scatters the packet data out to the host system's main memory.

Figure 1C:
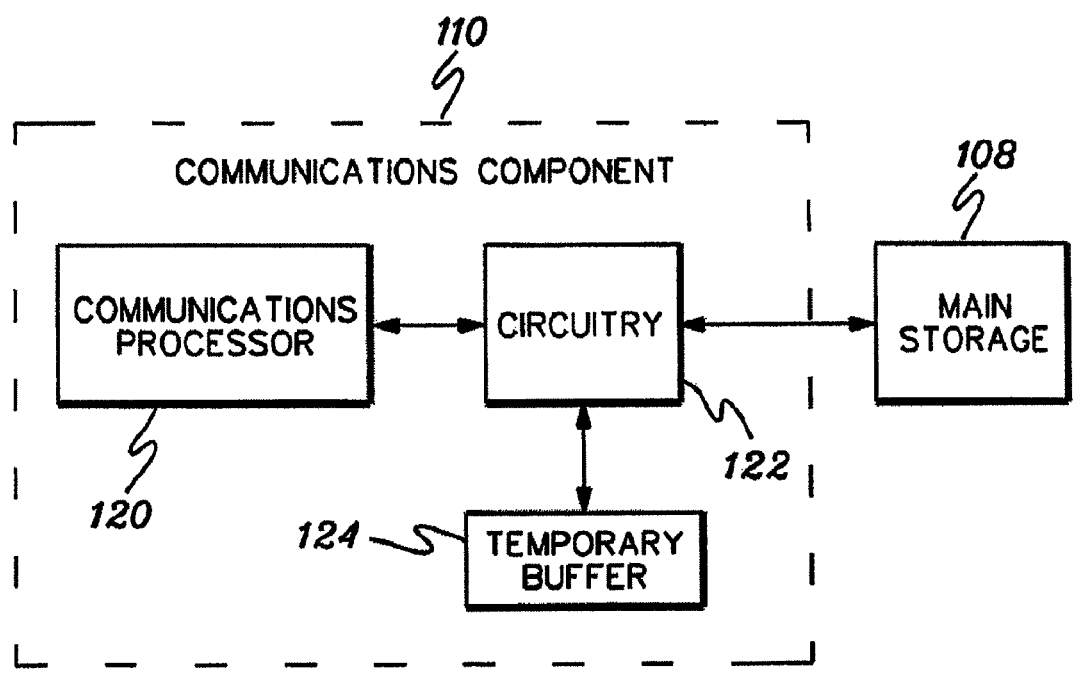
FIG. 1c depicts one embodiment of further details of a communications component of the communications unit of FIG. 1b, in accordance with an aspect of the present invention.

In one example, the communications component includes a communications processor 120 (FIG. 1c) and additional circuitry 122 used to send and/or receive packet data. The communications processor is to perform data gather and scatter operations in parallel with the main processor doing other computational work. Similarly, the communications processor employs circuitry 122 to perform the actual data movement, such that the data movement proceeds in parallel with the communications processor doing computations in support of the data movement, such as address translation.

For example, to send a 2 kB packet from Communications Unit A to Communications Unit B, the following steps are performed:
1. Communications Unit A provides a task, including a list of virtual addresses, to its communications processor that is to be used in gathering up the 2 kB of data to be sent out.
2. The communications processor in Communications Unit A processes through the list, calculating the physical addresses, and passes them on to circuitry 122.
3. Circuitry 122 issues the main memory requests, and gathers the packet data into a temporary buffer 124 of the communications component.
4. When the data has been gathered, the circuitry responds back to communications processor 120 that the gather is complete.
5. The communications processor initiates the sending of the gathered data out on the external connection to Communications Unit B.

Due to latencies associated with memory accesses, the step of gathering the data may take some time. Therefore, to improve throughput from the communications component, the main processor generally has multiple communications tasks outstanding at the communications processor at any given time. For example, while the data is being gathered at one step for a given packet, say Packet 1, the communications processor is calculating the addresses for a subsequent packet, such as Packet 2.

It is possible that the data is gathered for Packet 2, prior to the data being gathered for Packet 1. Thus, the communications processor may receive the data in an order that differs from the order in which the requests for the data were sent. In some environments, the communications processor can send the data over the external connection irrespective of the order. However, in other environments, particular implementations of the message passing protocol mandate that packets are to be sent out over the external connection in the order in which the requests were sent to the communications processor. Thus, previously, the communications processor had the responsibility for keeping an ordered list of the requests sent to the circuitry, so that it can send the responses out over the external connection in proper order, regardless of the order of receipt of the responses. This required special code within the communications processor, adding burden and expense to the processor.

To alleviate this burden and expense from the communications processor, a capability is provided, in accordance with an aspect of the present invention, in which the responses are provided to the communications processor in order, such that the communications processor can ignore the ordering. For instance, the communications processor receives one or more tasks that specify data to be obtained (e.g., provide addresses, etc.). The communications processor decomposes each task into one or more requests. The set of requests for a particular task is referred to as a request group, and each request of a request group is assigned a same task id. To mark the end of a request group, the last request of the group includes a response marker. As the requests of the request groups are sent by the communications processor to the circuitry, a record of the order of the request groups is maintained, so that the responses to the request groups are returned to the communications processor in the same order as the requests are sent.

The ordering of the request groups creates dependencies between the request groups. For example, for a given request group, there may be zero or more request groups that are to precede the given group or zero or more that may succeed the given group. The dependencies between the groups are tracked creating a dependency chain, which is used to ensure proper ordering to the communications processor. The dependency chain is kept in the hardware of the communications component and is established by the order of requests issued from the communications processor to the circuitry. The ordering information in the chain is used to either block the issuance of a response to the communications processor, if all of a request group's (or packet's) predecessors have not already responded; or after issuing the response for the current request group, issuing the responses for any successors that were previously blocked due to this response not having been sent.

Figure 2A:
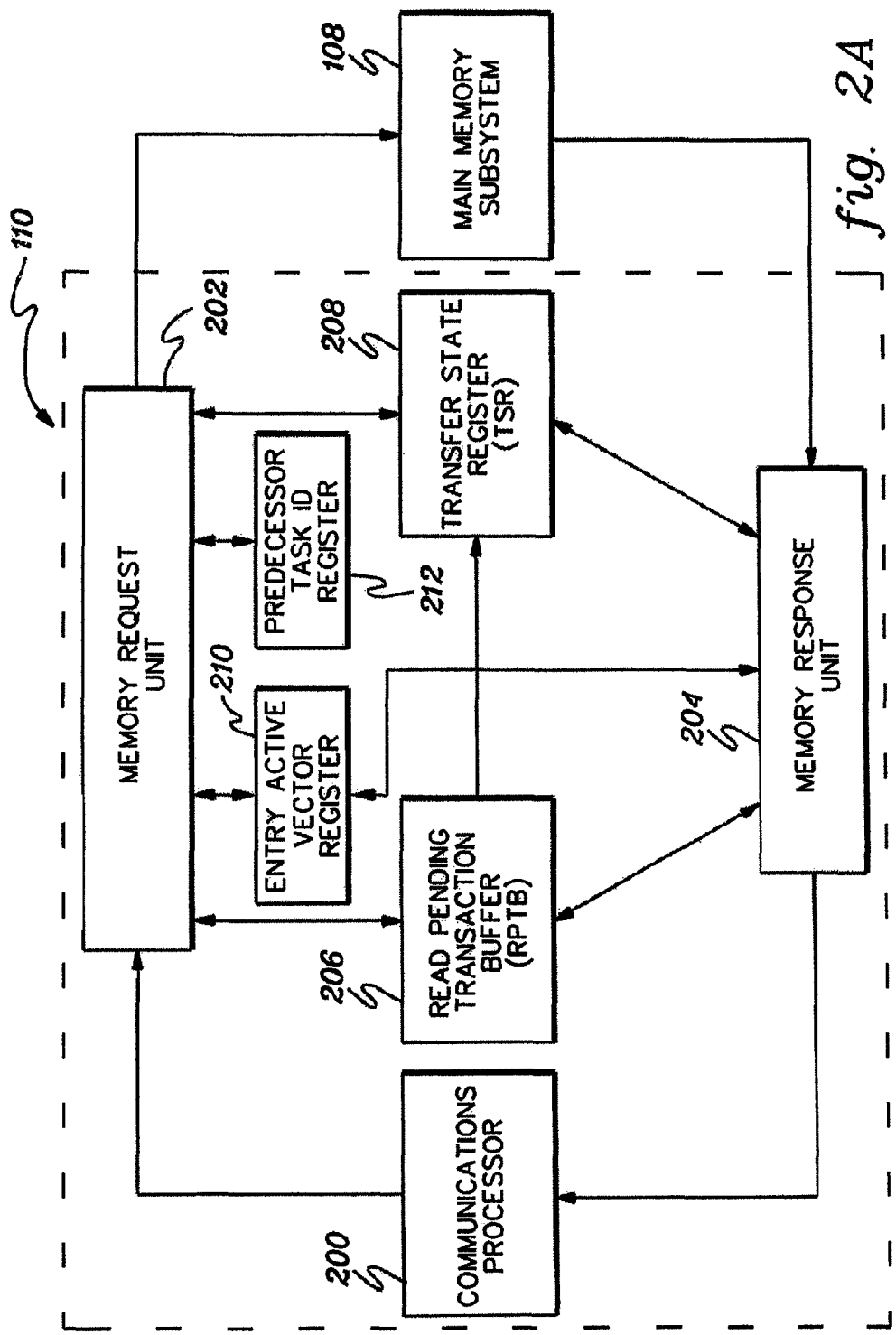
FIG. 2a depicts one example of yet further details of a communications component of the communications unit of FIG. 1b, in accordance with an aspect of the present invention.

One embodiment of the hardware (e.g., circuitry) used within the communications component to provide the dependency tracking is described with reference to FIG. 2a. In one example, communications component 110 includes a communications processor 200 coupled to a memory request unit 202 and a memory response unit 204. Memory request unit 202 is, for example, a finite state machine that is used to fetch data from main memory subsystem 108. Similarly, memory response unit 204 is a hardware finite state machine that is responsible for receiving data from the main memory subsystem.

Figure 2B:
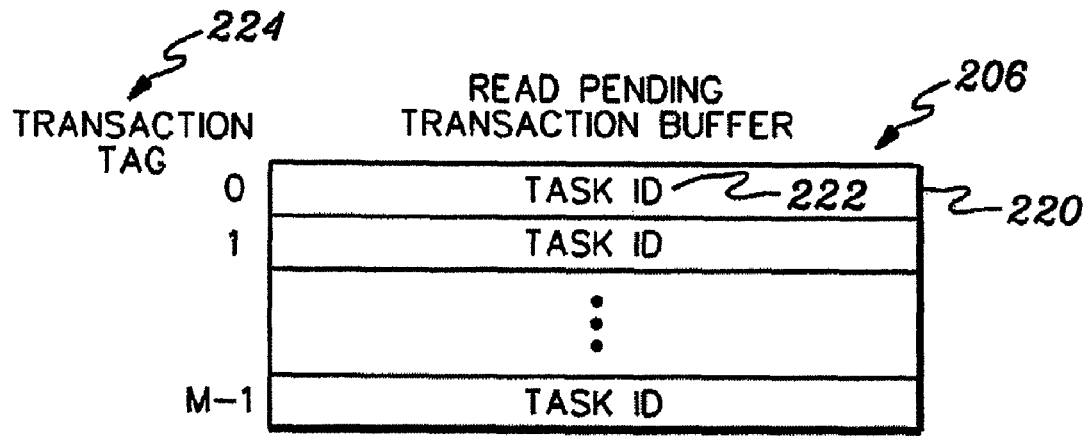
FIG. 2b depicts one embodiment of the data maintained in a Read Pending Transaction Buffer of FIG. 2a used in accordance with an aspect of the present invention.

The memory request unit is further coupled to an entry active vector register 210, which identifies any active tasks; and a predecessor task id register 212, which indicates the last task id to be processed, each of which is described in further detail below. Moreover, both the memory request unit and the memory response unit are coupled to a Read Pending Transaction Buffer (RPTB) 206 and a Transfer State Register (TSR) 208, which are hardware components used in satisfying requests of the communications processor. For example, Read Pending Transaction Buffer 206 is used to keep track of associations between request groups and transactions. Since there is typically a limited request size for accessing main memory, a request of a request group is decomposed into one or more transactions, each of which is sent to main memory. Each main memory transaction is identified by a transaction tag that is included as part of the request transaction to main memory and is returned as part of the response transaction from main memory. The transaction tag is used as an index into the Read Pending Transaction Buffer, which includes a plurality of entries 220 (FIG. 2b). Each entry includes, for instance, a task id 222 identifying a request group associated with the transaction.

Figure 2C:
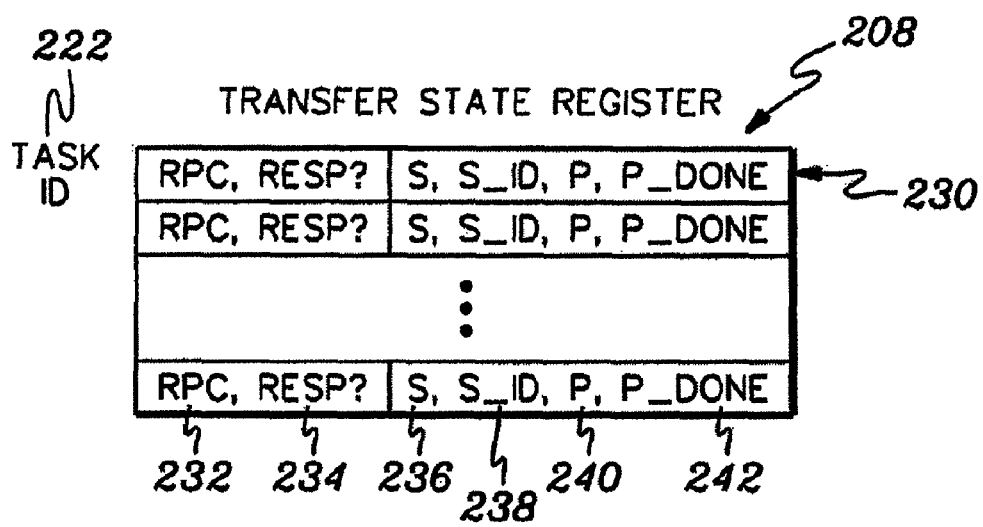
FIG. 2c depicts one embodiment of the data maintained in a Transfer State Register of FIG. 2a used in accordance with an aspect of the present invention.

Transfer State Register 208 (FIG. 2a) is used in determining whether all of the requests for a request group have been issued by the communications processor and if all the corresponding memory responses have been received. The Transaction State Register includes a plurality of entries 230 (FIG. 2c), and each entry is identified by task id 222. Each entry includes, for instance, a response pending count (RPC) 232 indicating a count of the outstanding memory transactions for a task id; a response indicator (RESP?) 234 indicating whether the response marker for the request group has been issued; a successor indicator (S) 236 indicating whether there is a successor for this task id; a successor identifier (S_ID) 238 identifying the successor, if there is one; a predecessor indicator (P) 240 indicating whether there is a predecessor to this task id; and a predecessor done indicator (P_DONE) 242 specifying whether all of the predecessors for this task id have been processed.

Figure 3:
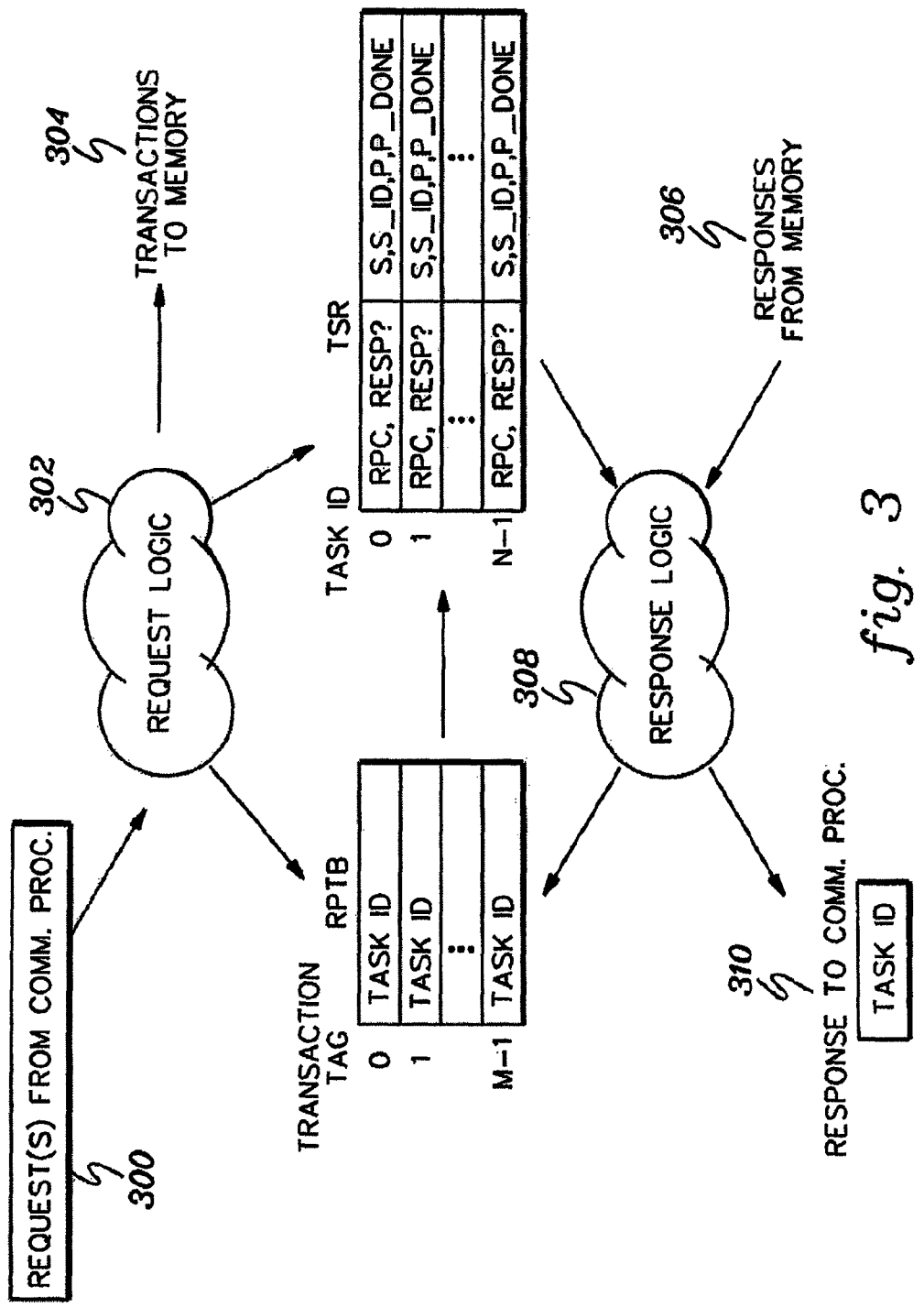
FIG. 3 pictorially depicts an overview of the logic of an aspect of the present invention.

One embodiment of an overview of the logic employed in handling requests of the communications processor is described with reference to FIG. 3. The communications processor issues a number of requests 300 to request logic 302. In this example, each request is of the same request group and has a Task Id of X. The final request of the group includes a response marker indicating an end of the request group for Task Id X. Request logic 302 breaks each request up into one or more main memory read transactions, each of which is assigned a unique tag that is used as part of the actual memory transaction. Each tag is also used to index into the Read Pending Transaction Buffer (RPTB) where Task Id X is stored. For each transaction that is issued, the read pending count for Task Id X in the Transaction State Register (TSR) is incremented. When the final transaction generated from the request with the response marker is sent out, the response indicator field is updated in the Transaction State Register entry for Task Id X.

Each main memory response that is received 306 includes a transaction tag. The tag is used by response logic 308 to index into the Read Pending Transaction Buffer to determine to which Task Id the response corresponds. The retrieved Task Id is then used to index into the Transaction State Register to decrement the read pending count for Task Id X. When the read pending count for Task Id X is zero and when the response indicator field has been set, response logic 308 determines whether it can respond back to the communications processor, as described in further detail below. Should the response logic determine that it can respond, it responds back to the communications processor indicating that all of the requested main memory requests for Task Id X have completed 310.

Figure 4A:
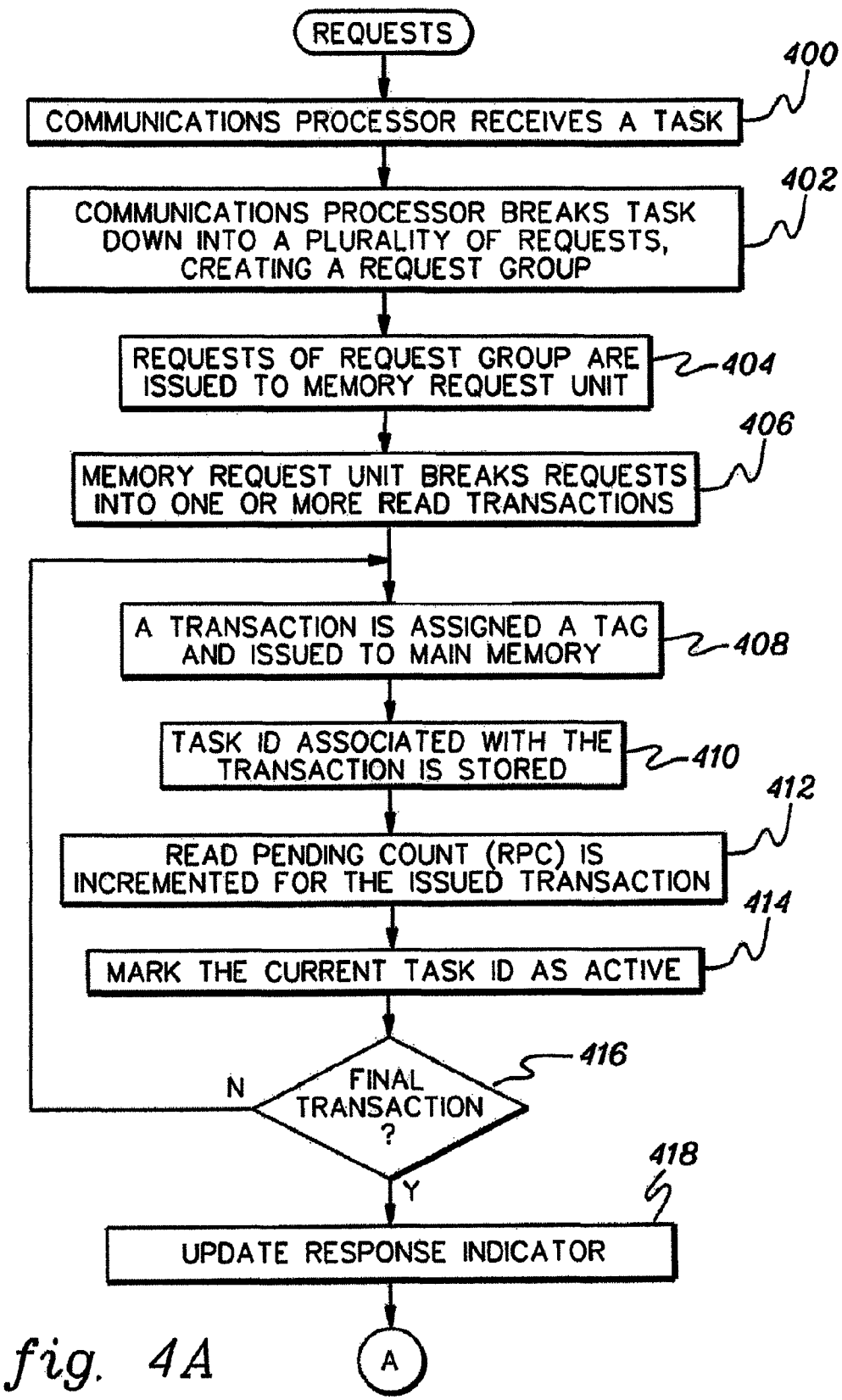
FIGS. 4a-4b depict one embodiment of the logic associated with processing requests, in accordance with an aspect of the present invention.
Figure 4B:
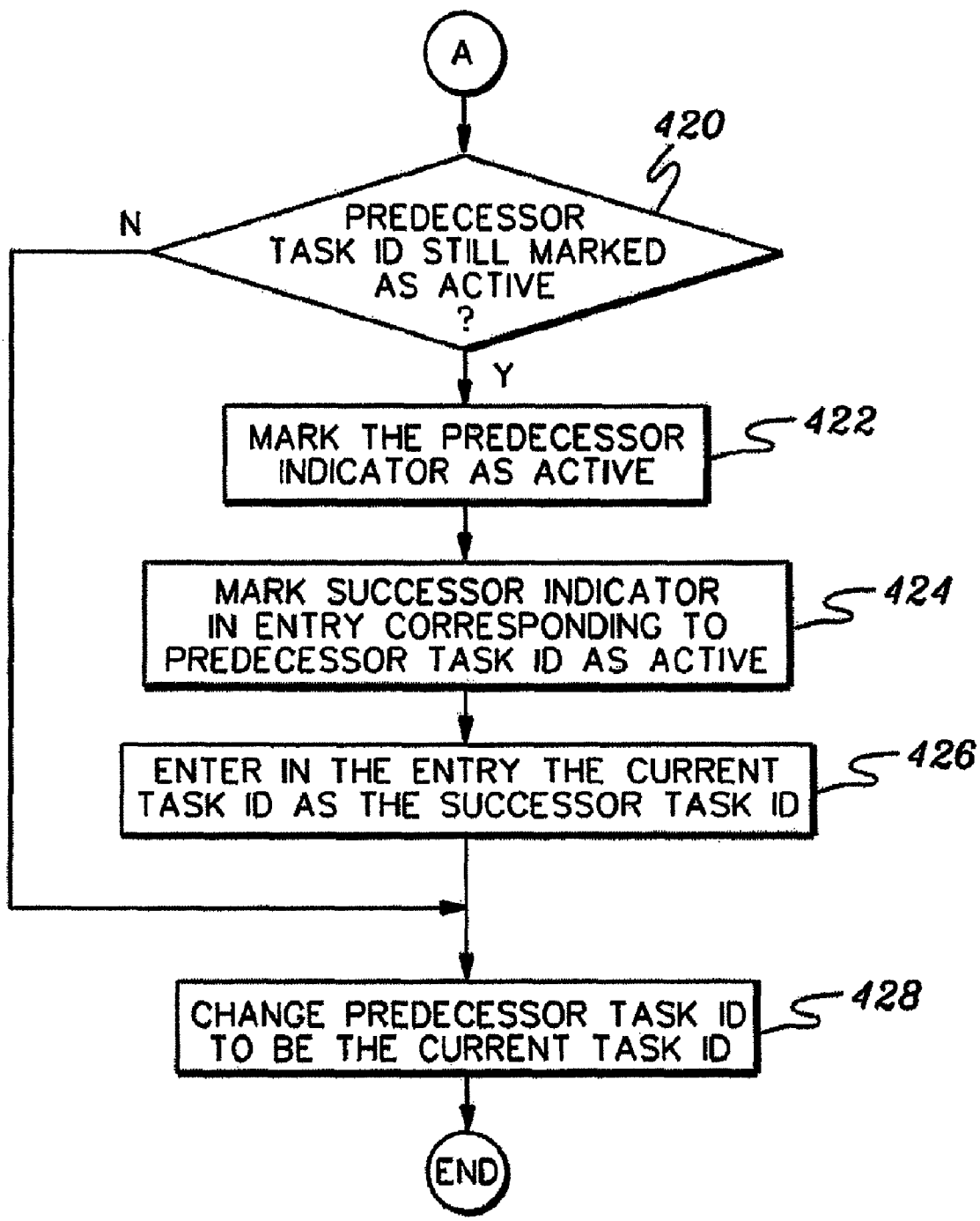

Further details associated with handling requests of a communications processor are described with reference to FIGS. 4a-4b. Referring to FIG. 4a, initially, a communications processor receives a task from a user, such as a user application, requesting the gathering of a packet of data, STEP 400. In order to gather the packet of data, the communications processor decomposes the task into one or more requests, which are grouped into a request group, STEP 402. For example, the communications processor translates the virtual addresses provided in the task into physical addresses and creates the requests, which are grouped into a request group. This grouping is performed by the communications processor assigning the same task id to each of the requests of the request group.

The requests of the request group are issued to the memory request unit, STEP 404, which decomposes each request into one or more read transactions, STEP 406.

A transaction of the one or more read transactions is selected by the memory request unit, assigned a tag and issued to main memory, STEP 408. The task id associated with the transaction is stored in the Read Pending Transaction Buffer, STEP 410, and the read pending count in the Transfer State Register (TSR) is incremented for the issued transaction, STEP 412. The first time that a given TSR entry is accessed for a request group to increment the read pending count, the entry is marked as active in the entry active vector register, STEP 414. Thereafter, a determination is made by the memory request unit as to whether this is the final transaction for the request group, INQUIRY 416. If it is not the final transaction, then processing continues with STEP 408. Otherwise, the response indicator in the Transfer State Register is updated for the current task id, STEP 418.

Processing of the memory request unit continues with a determination as to whether the predecessor task id, if any, is marked as active, INQUIRY 420. In one example, the predecessor task id is identified in the predecessor task id register of the communications component. It is the last task id to be processed prior to the current task id. The predecessor task id is used to index into the entry active vector register to determine whether the predecessor task id is active. If so, then the predecessor indicator in the Transfer State Register entry for the current task id is marked as active, STEP 422. Further, the successor indicator in the entry corresponding to the predecessor task id is also marked as active, STEP 424, and the current task id is entered in the entry corresponding to the predecessor task id as the successor task id, STEP 426. Thereafter, the predecessor task id in the predecessor task id register is changed to the current task id, STEP 428. This concludes the request side of the processing.

Figure 5A:
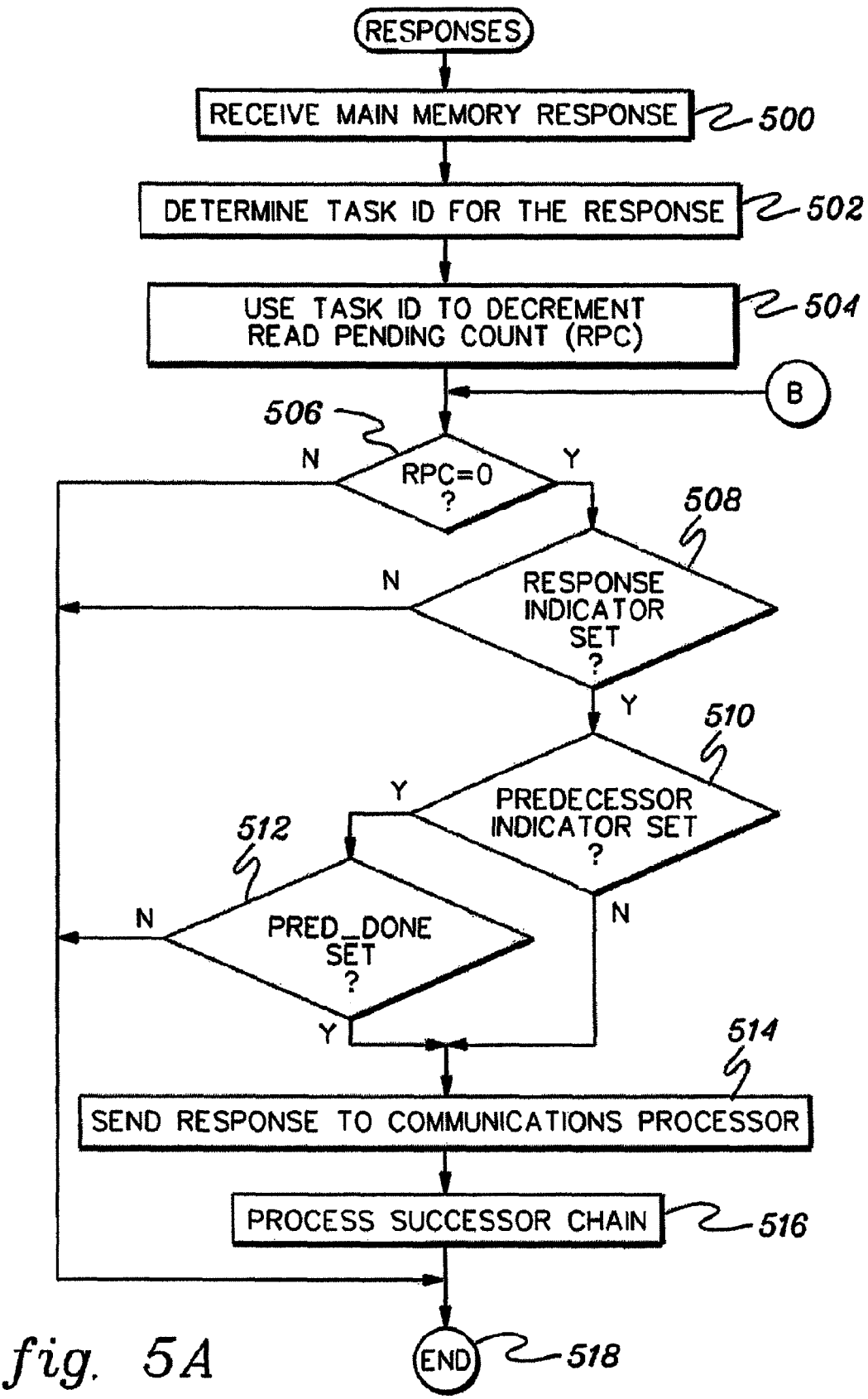
FIGS. 5a-5b depict one embodiment of the logic associated with processing responses, in accordance with an aspect of the present invention.
Figure 5B:
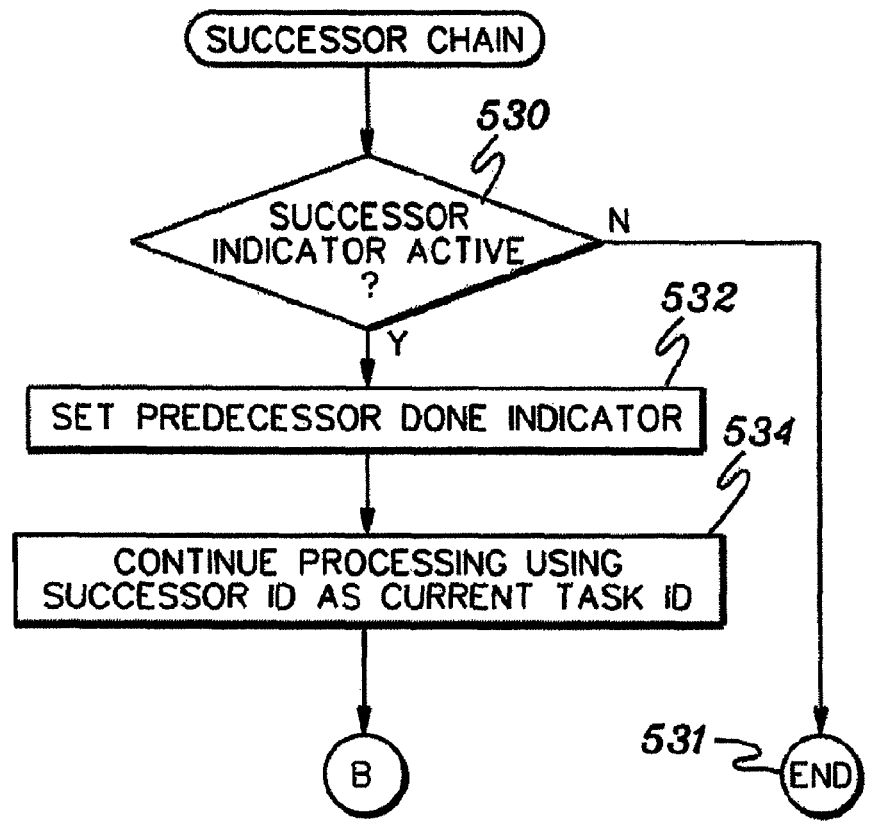

On the response side, when the memory response unit receives a main memory response, the memory response unit performs various actions, as described with reference to FIGS. 5a-5b. Referring initially to FIG. 5a, in response to the memory response unit receiving a response, STEP 500, it determines the task id for the response, STEP 502. In one example, this is accomplished by using the tag of the response as an index into the Read Pending Transaction Buffer to find out to which task id the response corresponds. The retrieved task id is then used to index into the Transfer State Register to obtain and decrement the read pending count for the task id, STEP 504.

Thereafter, a determination is made as to whether the read pending count is equal to zero, INQUIRY 506. If the read pending count is equal to zero, then a further determination is made as to whether the response indicator is set, INQUIRY 508. Should the response indicator be set, then a further determination is made as to whether the predecessor indicator is set, INQUIRY 510. If so, then a determination is made as to whether the predecessor done indicator is set, INQUIRY 512. Should the read pending count be zero, the response indicator be set, and both the predecessor indicator and predecessor done indicator be set, then a response for the request group is sent to the communications processor, STEP 514. This response represents, for instance, all of the responses for the requests of the request group, which are retrieved from a temporary buffer associated with the memory response unit. Similarly, if the read pending count is zero, the response indicator is set and the predecessor indicator is not set, a response for the request group is sent to the communications processor, STEP 514.

The successor chain, if any, is then processed, STEP 516. This is described with reference to FIG. 5b. In one embodiment, initially, a determination is made as to whether there is a successor chain, INQUIRY 530. For example, the successor indicator in the entry of the Transfer State Register corresponding to the current task id being processed is checked to see if it is active (e.g., set). If it is not active, then there is no successor chain to be processed, STEP 531. However, if the successor indicator is active, then the predecessor done indicator in the successor's entry identified by S_ID is set, STEP 532, and processing continues using the successor id as the current task id, STEP 534. That is, processing continues at INQUIRY 506 of FIG. 5a.

Returning to INQUIRY 506 of FIG. 5a, if the read pending count is not zero or if the response indicator is not set or if the predecessor done indicator is not set, then processing of the response is complete, STEP 518.

Figure 6:
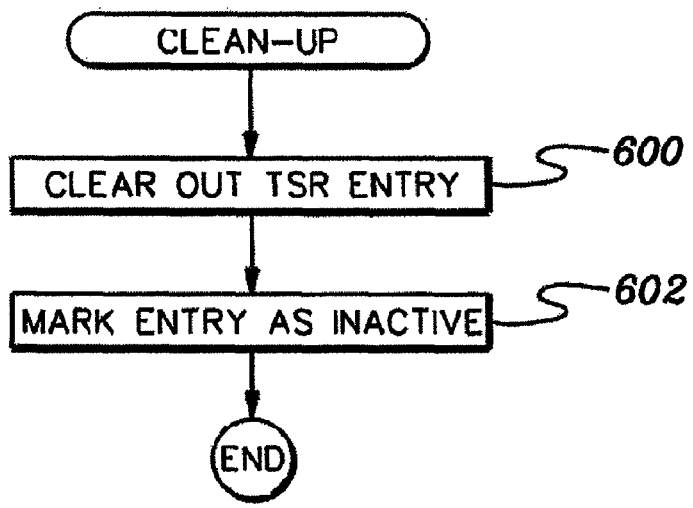
FIG. 6 depicts one embodiment of the logic associated with clean-up after responses are sent to a communications processor, in accordance with an aspect of the present invention.

When the response for the request group is sent from the memory response unit to the communications processor, then clean-up is performed by the memory response unit. For example, the corresponding entry in the Transaction State Register for that task id is cleared, STEP 600 (FIG. 6). Further, the corresponding entry in the entry active vector register is marked as inactive, STEP 602. This concludes the clean-up processing.

One example of grouping requests into request groups and tracking dependencies of the request groups is illustrated below. In this example, the task id order of the requests from the communications processor is 0-1-2-3, but the memory transaction completion order is 0-2-3-1. The hardware ensures that the order of the responses to the communications processor is 0-1-2-3.

1. The communications processor issues a number of requests for Task Id 0 to the hardware, and the final request has the response marker. As the hardware sends the resulting memory transactions out, it increments the read pending count in the Transfer State Register.
2. The communications processor issues a request group for Task Id 1. The hardware notices that predecessor Task Id 0 is still active. In the Transfer State Register entry for Task Id 1, the predecessor bit is set. Then, the successor bit is set and the successor id is set to 1 in the Transfer State Register entry for Task Id 0.
3. The communications processor issues a request group for Task Id 2. The same actions in step 2 are followed: The predecessor bit is set in the Transfer State Register entry for Task Id 2; and the successor bit is set and the successor id is set to 2 in the Transfer State Register entry for Task Id 1.
4. The communications processor issues a request group for Task ID 3. The same actions in step 2 are followed: The predecessor bit is set in the Transfer State Register entry for Task ID 3; and the successor bit is set and the successor id is set to 3 in the Transfer State Register entry for Task id 2.
5. As memory responses are received that correspond to Task Id 0, the read pending count in the Transfer State Register entry for Task Id 0 is decremented. When the final memory response for Task Id 0 is received, the read pending count value is 0. Because the predecessor bit for Task Id 0 is not set, a response, which represents responses for the requests of the group, is issued to the communications processor. Then, the predecessor done bit is set in the Transfer State Register entry for Task Id 1. Task 0 is invalidated.
6. Next, the final memory response for Task Id 2 is received (the read pending count value goes to 0). Because the predecessor bit in the Transfer State Register entry for Task Id 2 is set, but the predecessor done bit has not yet been set, no further action is taken.

7. Next, the final memory response for Task Id 3 is received (the read pending count value goes to 0). Because the predecessor bit in the Transfer State Register entry for Task Id 2 is set, but the predecessor done bit has not yet been set, no further action is taken.

8. Finally, the final memory response for Task Id 1 is received. Because the predecessor done bit is set in the Transfer State Register entry for Task Id 1 (see step 5), a response for the request group of Task Id 1 can be sent to the communications processor. Then, the predecessor done bit is set in the Transfer State Register entry for Task Id 2. Task 1 is invalidated.

9. Because the read pending count is equal to 0 for Task Id 2, and because the response marker field is set, a response is sent to the communications processor for Task Id 2. The predecessor done bit is set in the Transfer State Register entry for Task Id 3. Task 2 is invalidated.

10. Because the read pending count is equal to 0 for Task Id 3, and because the response marker field is set, a response is sent to the communications processor for Task Id 3. Task 3 is invalidated.

Described in detail above is a hardware facility for establishing a dependency chain based on task ids. The dependency chain is maintained in hardware and relieves the communications processor of the burden and expense of determining packet order. The communications processor does not receive responses for a request group until the responses for all predecessor request groups have been sent to the communications processor. Thus, the communications processor can ignore packet order.

Since hardware is being used to track the dependencies, the communications processor need not issue instructions to maintain or determine the order thus, using fewer processing cycles.

To facilitate the chaining, a tag is used. This tag is minimally sized, in one embodiment, since it can be reused.

The ordering described herein is, for instance, between request groups. The ordering within a request group is handled by a different mechanism that is not germaine to the one or more aspects of the present invention.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing request groups of a communications environment, said method comprising:
obtaining a plurality of request groups, wherein the obtaining comprises decomposing, by a communications processor of the communications environment, multiple communications tasks into a plurality of requests for the multiple communications tasks and grouping, by the communications processor, the plurality of requests into the plurality of request groups, wherein one request group of the plurality of request groups comprises a set of requests of the plurality of requests, the set of requests being associated with one communications task of the multiple communications tasks;
tracking, by hardware of the communications environment, a time-based dependency between at least multiple request groups of the plurality of request groups, the hardware being separate from the communications processor; and
sending a response for a request group of the at least multiple request groups to the communications processor of the communications environment in an order indicated by the tracking, wherein the communications processor is alleviated from determining order of responses.

2. The method of claim 1, wherein the sending of a response is facilitated by a memory response unit coupled to the communications processor, said memory response unit receiving the response from main memory.

3. The method of claim 2, wherein the response indicates that at least one request of the request group has been processes, said at least one request being issued from said communications processor to a memory request unit coupled thereto, said memory request unit facilitating the sending of the at least one request to main memory.

4. The method of claim 1, wherein the time-based dependency corresponds to an order in which one or more requests of the at least multiple request groups were issued from the communications processor of the communications environment.

5. The method of claim 1, wherein the hardware comprises a state data structure comprising a predecessor indicator specifying whether a request group of the at least multiple request groups has a predecessor and a successor indicator specifying whether the request group has a successor.

6. The method of claim 5, wherein the state data structure is indexed by a task id of the request group.

7. The method of claim 6, wherein the task id used to index into the state data structure is obtained from another data structure indexed by a tag, said tag identifying a read memory transaction corresponding to a request of the request group.

8. The method of claim 1, further comprising:
determining, based on the tracking, that a response for a request group of the plurality of request groups is to be sent to the communications processor of the communications environment;
checking, in response to being able to send the response, whether there are one or more successor request groups of the request group; and
sending to the communications processor one or more responses for the one or more successor request groups, in response to the checking indicating there are one or more successor request groups.

9. The method of claim 8, wherein the determining comprises:
determining whether there are one or more request groups that precede the request group; and
checking, in response to the determining indicating that one or more request groups precede the request group, whether one or more responses for the one or more request groups that precede the request group have been sent to the communications processor.

10. The method of claim 8, wherein the determining comprises ensuring that responses of all predecessor request groups of the request group have been sent to the communications processor.

11. A system of managing request groups of a communications environment, said system comprising:

means for obtaining a plurality of request groups, wherein the means for obtaining comprises means for decomposing, by a communications processor of the communications environment, multiple communications tasks into a plurality of requests for the multiple communications tasks and grouping, by the communications processor, the plurality of requests into the plurality of request groups, wherein one request group of the plurality of request groups comprises a set of requests of the plurality of requests, the set of requests being associated with one communications task of the multiple communications tasks;

means for tracking, by hardware of the communications environment, a time-based dependency between at least multiple request groups of the plurality of request groups, the hardware being separate from the communications processor; and means for sending a response for a request group of the at least multiple request groups to the communications processor of the communications environment in an order indicated by the tracking, wherein the communications processor is alleviated from determining order of responses.

12. The system of claim 11, wherein the means for sending a response comprises a memory response unit coupled to the communications processor, said memory response unit receiving the response from main memory.

13. The system of claim 12, wherein the response indicates that at least one request of the request group has been processed, said at least one request being issued from said communications processor to a memory request unit coupled thereto, said memory request unit facilitating the sending of the at least one request to main memory.

14. The system of claim 11, wherein the time-based dependency corresponds to an order in which one or more requests of the at least multiple request groups were issued from the communications processor of the communications environment.

15. The system of claim 11, wherein the hardware comprises a state data structure comprising a predecessor indicator specifying whether a request group of the at least multiple request groups has a predecessor and a successor indicator specifying whether the request group has a successor.

16. The system of claim 15, wherein the state data structure is indexed by a task id of the request group.

17. The system of claim 16, wherein the task id used to index into the state data structure is obtained from another data structure indexed by a tag, said tag identifying a read memory transaction corresponding to a request of the request group.

18. The system of claim 11, further comprising:

means for determining, based on the tracking, that a response for a request group of the plurality of request groups is to be sent to the communications processor of the communications environment;

means for checking, in response to being able to send the response, whether there are one or more successor request groups of the request group; and means for sending to the communications processor one or more responses for the one or more successor request groups, in response to the checking indicating there are one or more successor request groups.

19. The system of claim 18, wherein the means for determining comprises:

means for determining whether there are one or more request groups that precede the request group; and means for checking, in response to the determining indicating that one or more request groups precede the request group, whether one or more responses for the one or more request groups that precede the request group have been sent to the communications processor.

20. A system of managing request groups of a communications environment, said system comprising:

a plurality of request groups, the plurality of request groups obtained by decomposing, by a communications processor of the communications environment, multiple communications tasks into a plurality of requests and grouping, by the communications processor, the plurality of requests into the plurality of request groups, one request group of the plurality of request groups comprising a set of requests associated with one communications task of the multiple communications tasks;

hardware of the communications environment to track a time-based dependency between at least multiple request groups of the plurality of request groups; and a memory response unit coupled to the hardware and to a communications processor of the communications environment, said memory response unit to receive a response for a request group of the at least multiple request groups from main memory and to send the response to the communications processor, in a time-based order indicated by the hardware tracking, wherein the response is for at least one request of the request group, said at least one request being issued from said communications processor to a memory request unit coupled thereto, said memory request unit to facilitate the sending of the at least one request to main memory.

* * * * *